United States Patent [19]
Defrese

[11] 3,944,377
[45] Mar. 16, 1976

[54] INTERLOCKING JOINT

[76] Inventor: Jesse G. Defrese, 8500 Red Hill Country Club Drive, Cucamonga, Calif. 91730

[22] Filed: Sept. 13, 1974

[21] Appl. No.: 505,731

[52] U.S. Cl. .................. 403/189; 52/760; 403/407
[51] Int. Cl.² ..... B25G 3/00; F16D 1/00; F16B 7/22
[58] Field of Search ...... 403/407, 189; 52/760, 285, 52/656, 758 H; 297/440

[56] References Cited
UNITED STATES PATENTS

| | | | |
|---|---|---|---|
| 3,263,388 | 8/1966 | Bogert | 52/489 X |
| 3,360,896 | 1/1968 | Wright | 52/489 |
| 3,553,915 | 1/1971 | Passovoy | 52/489 X |
| 3,665,666 | 5/1972 | Delcroix | 52/489 X |

*Primary Examiner*—Andrew V. Kundrat
*Assistant Examiner*—Wayne L. Shedd
*Attorney, Agent, or Firm*—Don B. Finkelstein

[57] ABSTRACT

An interlocking construction arrangement for coupling together two members at a predetermined angular relationship. A male joining means is coupled to the first member and has an outwardly upstanding male portion extending from the first member at the predetermined angular relationship. A female joining means is coupled to the second member and the female joining means has walls defining a male portion receiving cavity. When it is desired to join the two members together the male portion is inserted into the cavity of the female joining means where it may be frictionally retained to provide a removable coupling between the members or bonded or otherwise secured together to provide a permanent coupling of the two members.

16 Claims, 13 Drawing Figures

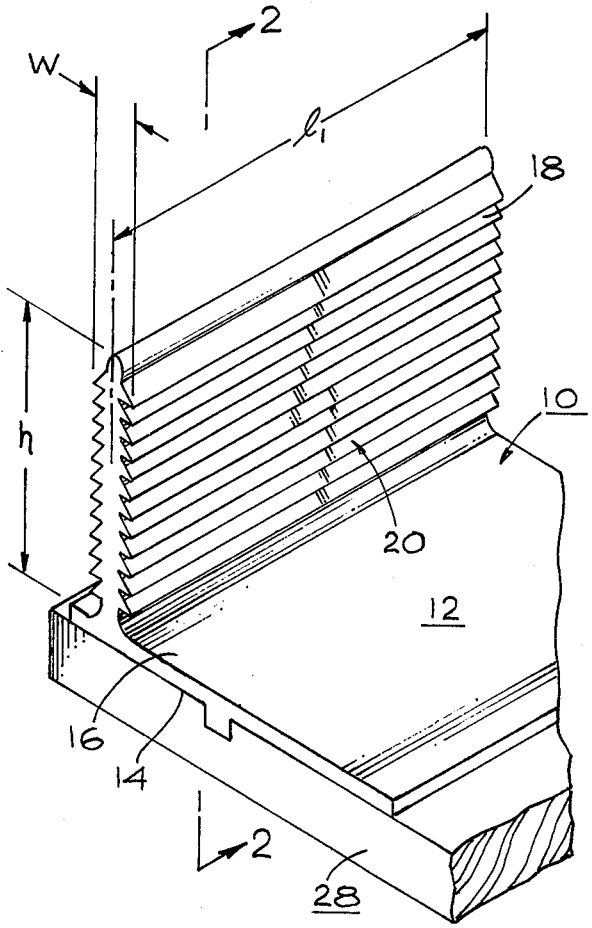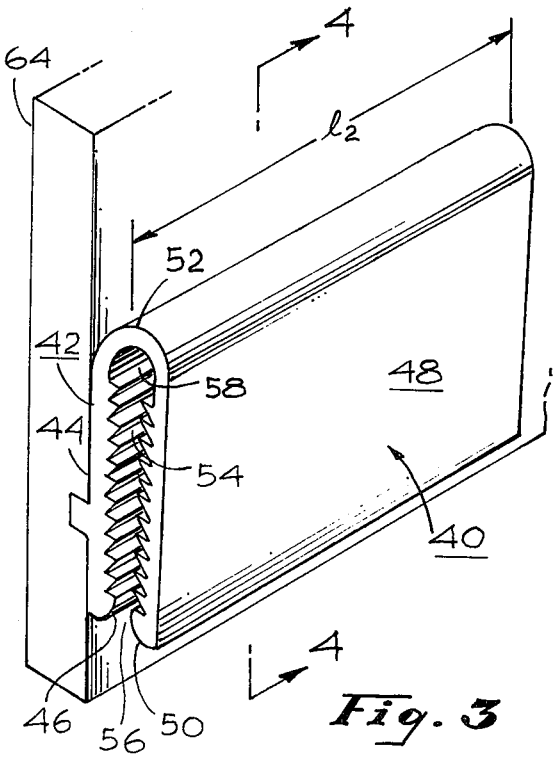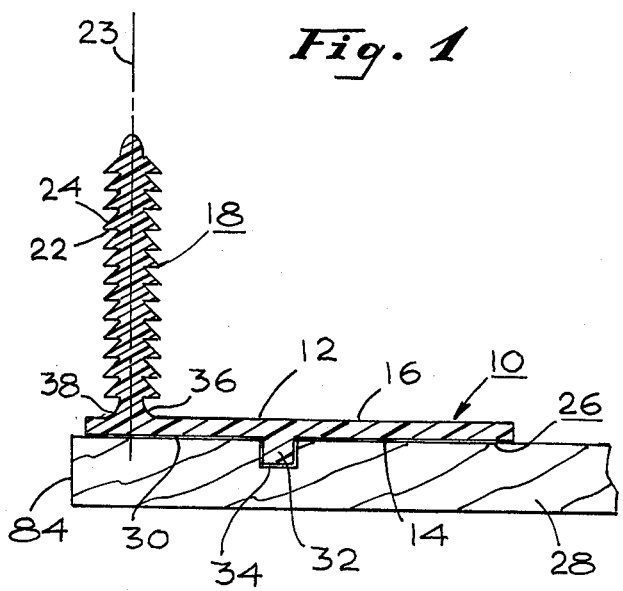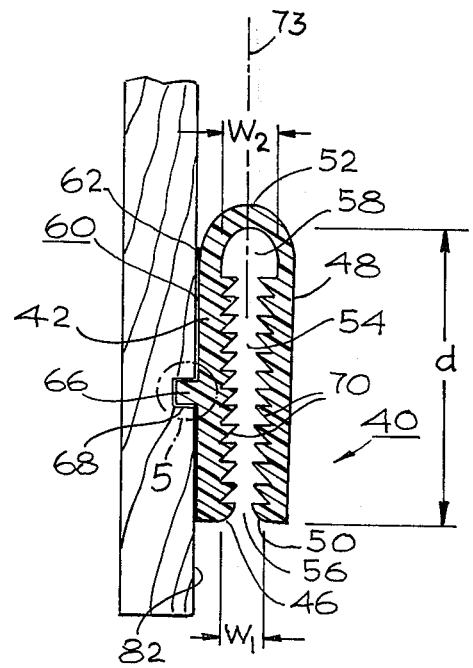
Fig. 1
Fig. 3
Fig. 2
Fig. 4

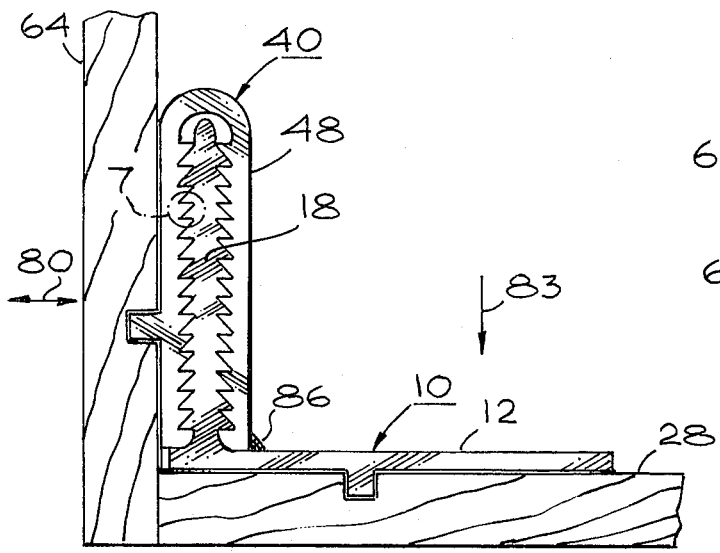
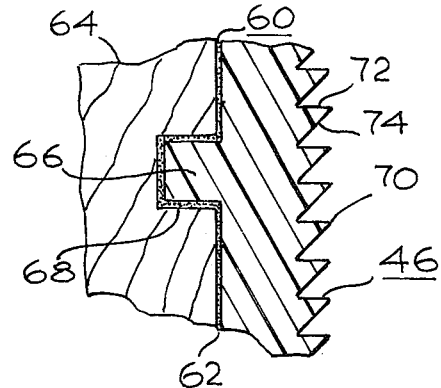
Fig. 6
Fig. 5
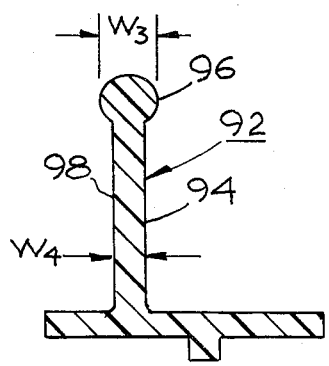
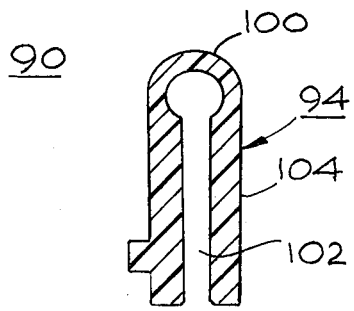
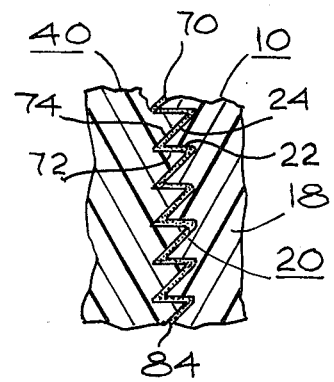
Fig. 8A
Fig. 8B
Fig. 7
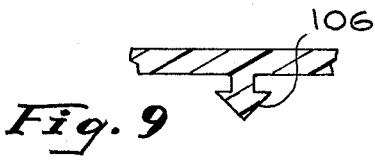
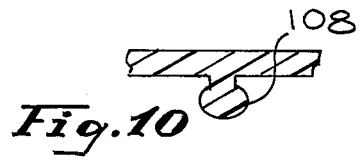
Fig. 9
Fig. 10
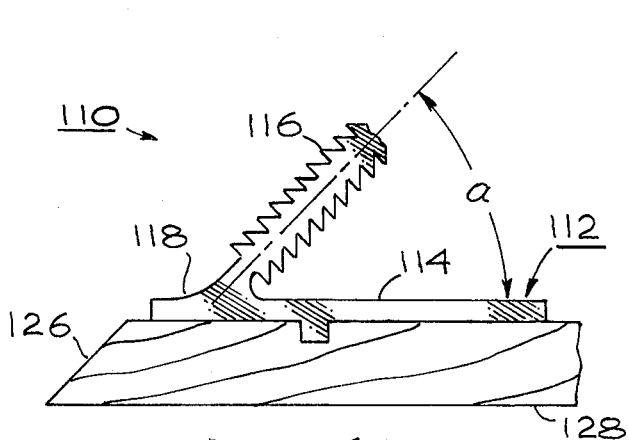
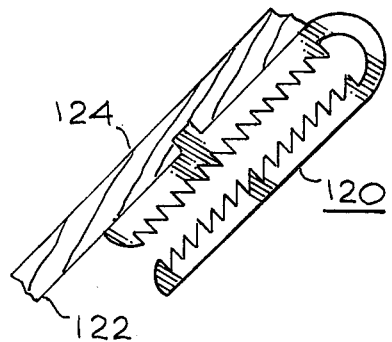
Fig. 11
Fig. 12

INTERLOCKING JOINT

BACKGROUND OF THE INVENTION

1. Field of the Invention

This invention relates to the joining art and more particularly to an interlocking construction arrangement for joining together two members at a predetermined angular relationship.

2. Description of the Prior Art

In many applications it is desired to provide an interlocking construction arrangement for joining together two members at a predetermined angular relationship. For example, in the fabrication of furniture the tops, sides, fronts and backs of such structures must be joined together in a particular angular relationship to provide a useful, final structure. Similarly, drawers as utilized in cabinets or the like have fronts, backs and sides and also must be joined together, usually at right angles. The bottoms of drawers in such cabinets, in accordance with conventional practice, are often fitted into slots in the fronts, backs, and sides.

In order to affect economy in the manufacture, shipping, and storage of cabinets and/or drawers for cabinets, it is very often desired to be able to fabricate the separate components comprising the structure and ship them in what is termed a "knocked down" configuration. That is, in such a K.D. configuration, each of the separate members which are ultimately assembled into the final structure are not joined together at the factory but may be shipped unjoined. As such, they may be shipped and stored in a volume that may be several orders of magnitude less than the volume that would be occupied by the assembled structure.

However, in many such prior K.D. constructions, the drawers that were utilized therein were still fully assembled when shipped and utilized the conventional dovetail interconnecting arrangement between the members forming the drawer structure. As such, considerable volume was wasted by the requirement of shipping and storing fully assembled drawers, if not the whole cabinets. To provide a construction arrangement of the interlocking type that may be utilized in such cabinets and/or the drawers therefor, the arrangement for providing the interlocking construction must be readily adaptable for quick and easy installation by the ultimate purchaser to provide a satisfactory assembled structure. Further, such interlocking construction arrangement must also provide the rigidity, strength and appearance, after assembly, of similar structures that have been fabricated and assembled by the manufacturer prior to shipping.

SUMMARY OF THE INVENTION

Accordingly, it is an object of the present invention to provide an improved interlocking construction arrangement.

It is another object of the present invention to provide an improved interlocking construction arrangement for joining together various structural elements in a predetermined angular relationship.

It is yet another object of the present invention to provide a comparatively inexpensive interlocking construction arrangement for joining together members at a predetermined angular relationship wherein the assembly of the members may be rapidly and easily made by comparatively inexperienced people.

It is yet a further object of the present invention to provide an improved interlocking construction arrangement that provides much greater economy in the manufacture, shipping, and storage of structural arrangements such as cabinets, drawers, desks, and other furniture arrangements by allowing shipment and storage of the individual members in a "knocked down" configuration.

The above and other objects of the present invention are achieved, according to a preferred embodiment thereof by providing a male joining means that is coupled to a first member at a preselected location. The first member may, for example, comprise the sides of a drawer. The male joining means has a base portion and the base portion has a first surface that is coupled to the first member. The coupling may, for example, be by adhesive bonding or the like to provide a permanent coupling relationship therebetween. A male portion of the male joining means extends outwardly and upwardly from a second surface of the base portion. The male joining means has a preselected length along the base portion and extends thereabove a preselected height and has a predetermined thickness. The male portion extends from the base portion at the preselected angular relationship which, for example, may be right angles.

A female joining means is coupled to the second member that is to be joined to the first member and the second member may, for example, comprise the front and back of the drawer. The female joining means has a base portion having a first surface coupled to the second member. The coupling of the first surface of the female joining means to the second member may also be, for example, by adhesive bonding to provide a permanent coupling therebetween.

The female joining means also has an outer portion spaced from the base portion and the outer portion has an interior wall that is oppositely disposed from a second surface of the base portion to define a male portion receiving cavity therebetween having an open end and a closed end.

In the assembly of the components forming, for example, the above mentioned drawer, the male portion of the male joining means on the sides are inserted into the open end of the cavity in the female joining means of the front and back of the drawer and are frictionally retained therein. Such installation may be quickly and easily made by even inexperienced people. The frictional retention allows a detachable coupling of the first member to the second member. If, however, it is desired to provide a permanent coupling, adhesive bonding may be provided between, for example, the male portion inserted into the cavity of the female joining means, or, if desired, between the outer portion of the female joining means and the base portion of the male joining means, or both. The cavity of the female joining means may extend the same length as the length of the male portion of the male joining means or the lengths may be different, depending upon the particular installation desired. Similarly, both male and female joining members may extend full or part of the total depth of the drawer.

BRIEF DESCRIPTION OF THE DRAWINGS

The above and other embodiments of the present invention may be more fully understood from the following detailed description taken together with the accompanying drawing wherein similar reference characters refer to similar elements throughout and in which:

FIG. 1 is a perspective view of a male joining means useful in the practice of the present invention;

FIG. 2 is a sectional view along the line 2—2 of FIG. 1;

FIG. 3 is a perspective view of a female joining means useful in the practice of the present invention;

FIG. 4 is a sectional view along the line 4—4 of FIG. 3;

FIG. 5 is a sectional view of a portion of FIG. 4;

FIG. 6 shows the assembly of the male joining means of FIG. 1 with the female joining means of FIG. 3;

FIG. 7 is an enlarged sectional view of a portion of FIG. 6;

FIGS. 8A and 8B illustrate another embodiment useful in the practice of the present invention;

FIG. 9 illustrates another embodiment of the present invention;

FIG. 10 illustrates another embodiment of the present invention; and

FIGS. 11 and 12 illustrate another embodiment of the present invention.

DESCRIPTION OF THE PREFERRED EMBODIMENTS

Referring now to FIG. 1 there is shown a male joining means generally designated 10. The male joining means 10 is provided with a base portion 12 and the base portion 12 has a first surface 14 and a second surface 16. The male joining means 10 also has a male portion 18 extending outwardly and upwardly from the base portion 12 at a predetermined angular relationship. As shown in FIGS. 1 and 2, the predetermined angular relationship is, in this embodiment, a right angle. As discussed below in greater detail in connection with FIGS. 11 and 12, the predetermined angular relationship may be any other desired angle in the practice of the present invention.

The male portion 18 of the male joining means 10 has a first preselected length $l_1$ along the base portion 12 thereof, a first preselected height $h$ extending from the second surface 16 of the base portion 12 and a first preselected width $w$. The male portion 18 is also provided, in this imbodiment of the invention, with a plurality of striations generally designated 20. As shown in the embodiment illustrated in FIGS. 1 and 2 the striations comprise a plurality of substantially parallel arrayed right triangular prisms extending substantially the entire length $l_1$ of the male portion 18 and in an array substantially the full height $h$ of the portion 18. The striations 20, in this embodiment of the present invention, comprise retention means for retaining the male member 18 in the female joining means, as described below in greater detail in connection with FIG. 6.

Each of these striations 20 have an inner surface 22, as shown on FIG. 2 that extends substantially perpendicularly to the median plane 23 of the male portion 18 and an outer surface 24.

The male joining means 10 is provided with a first attachment means generally designated 26 for attaching the male joining means 10 to a first member 28. In the embodiment of the invention illustrated in FIGS. 1 and 2 the first member 28 may comprise, for example, the sides of a drawer. The first attachment means 26 may comprise an adhesive bonding layer 30 intermediate the first surface 18 of the base portion 12 of the male joining means 10 and the first member 28. Additionally, if desired, an inwardly extending mounting section 32 may extend from the first surface 14 of the base portion 12 into a groove 34 in the first member 28. The adhesive layer 30 may also extend, as shown in greater detail, for example, in FIG. 5, between the mounting section 32 and the first member 28.

In preferred embodiments of the present invention, as shown in FIG. 2, the male portion 18 is joined to the base portion 12 by a rounded fillet 36 and 38 to provide additional strength at the interconnection therebetween.

It is preferred that the male joining means 10 be fabricated from any high strength engineering plastic in order to provide a low cost and inexpensive structure. As such, it may therefore be extruded in the desired shape as shown. Such materials as high density polyethylene, polyvinylchloride, or any other type of high strength thermoplastic may be utilized to provide the semi-rigid resilient characteristics suitable for the application.

The male joining means 10 may extend the entire depth of the first member 28 in the direction indicated by the length $l_1$ or may be only extended over a portion thereof, as desired for particular applications when considerations of the size and desired strength of connection are determined.

Referring now to FIGS. 3 and 4 there is illustrated a female joining means generally designated 40 useful in the practice of the present invention and adaptable for utilization with the male joining means 10 shown in FIGS. 1 and 2. As shown in FIGS. 3 and 4 the female joining means 40 is provided with a base portion 42 having a first surface 44 and a second surface 46. The female joining means 40 also has an outer portion 48 spaced from the base portion 42 and having an inner surface 50 oppositely disposed to the first surface 46 of the base portion 42. The outer portion 48 is connected to the base portion 42 by the portion 52 to define a cavity 54 having an open end 56 and a closed end 58. The cavity 54 is adapted to receive the male portion 18 of the male joining means 10 shown in FIGS. 1 and 2. A second attachment means 60, which may be similar to the first attachment means 26 described above, may comprise a layer of adhesive bonding 62 between the first surface 44 of the base portion 42 and a second member 64 as illustrated most clearly in FIG. 4. Further, if desired, the female joining means 40 may also be provided with a mounting section 66, similar to the mounting section 32 shown in FIGS. 1 and 2 extending into a groove 68 in the second member 64. Thus the second attachment means 60 as utilized to permanently couple the female joining means 40 to the second member 64 is, in this embodiment of the present invention, substantially identical to the first attachment means 26 described above.

FIG. 5 is an enlarged view of the portion 5 of FIG. 4 and illustrates the second attachment means 60 in greater detail.

The second surface 46 of the base portion 42 and the oppositely disposed inner surface 50 of the outer portion 48 of the female joining means 40 are provided with striations 70. As shown in FIGS. 3, 4, and 5, the striations comprise a plurality of parallel arrayed right triangular prisms extending substantially the full length $l_2$ of the cavity 54 and substantially the full depth $d$ thereof from the open end 56 to the closed end 58. The striations 70, as shown most clearly in FIG. 5 are comprised of the above mentioned plurality of right triangular prisms each having an upper surface 72 substantially perpendicular to the median plane 73 of the cavity 54 and a lower surface 74.

In preferred embodiments of the present invention the width $w_1$ of the open end 56 of the cavity 54 is smaller than the width $w_2$ of the cavity 54 adjacent the closed end 58 thereof and the female joining means 40 may be fabricated from the same material as the male joining means 10 described above to provide a semirigid structure having a predetermined resiliency suitable for the application. The outer portion 48 of the female joining means 40 may be flexed outwardly from the base portion 42, flexing along the median plane 73 at the top portion 52 to allow insertion of the male portion 18 of the male joining means 10 shown in FIG. 2.

FIG. 6 illustrates an interconnection between the female joining means 40 coupled to the second member 64 and the male joining means 10 coupled to the first member 28. When it is desired to provide the assembly as shown in FIG. 6 the male portion 18 is inserted into the cavity 54 of the female joining means 40 and the predetermined resiliency of the materials allow the striations on the male member 18 to pass through the cavity 54 and the striations 70 on the surfaces thereof until full insertion is achieved. The striations, as noted above, provide a retention means for retaining the male portion 18 in the cavity 54. This retention is a frictional retention unless it is desired to make a more permanent installation. For example, in many applications it may be desirable to provide, for example, in a drawer construction, the capability of allowing detachment of the members comprising the drawers when it is desired, for example, to move, store or otherwise disassemble the drawer. The predetermined resiliency of the components allow such disassembly. Further, by providing the female joining means 40 on the second member 64 comprising the front of the drawer and the male joining means 10 on the first member 28 comprising the side of the drawer, the forces exerted thereon in opening and closing the drawer in the direction indicated by the arrow 80 are distributed throughout the lengths $l_1$ and $l_2$ of the male joining means 10 and female joining means 40, respectively, and, it has been found, that such an installation provides a tight non-deforming installation. The surface section 82 of the second member 64 abuts against the surface section 84 of the first member 28 and is retained in this abutment relationship by the interconnection of the male joining means 10 with the female joining means 40. It will be appreciated that FIG. 6 illustrates one corner of a typical drawer construction wherein the present invention is utilized. The other corners would be similarly arranged to allow complete assembly of a drawer construction in accordance with the principles of the present invention.

FIG. 7 illustrates an enlarged view of section 7 of FIG. 6. As shown in FIG. 7, it can be seen that the striations 20 when the male portion 18 is fully inserted into the cavity 54 of the female joining member 40 are frictionally retained by the striations 70 on the surfaces defining the cavity 54. The inner surfaces 22 of each of the striations 20 on the male portion 18 of the male joining member 10 abut against the outer surfaces 72 of the striation 70 on the surfaces defining the cavity 54 to provide a frictional retention therebetween after installation. However, because of the predetermined resiliency in the preferred embodiments of the present invention by exerting a force in the direction indicated by the arrow 83 on FIG. 6 sufficient to cause the outer portion 48 of the female joining member 40 to move outwardly the male member 10 may be withdrawn. In those embodiments wherein a permanent attachment is desired, a layer of adhesive bonding such as that indicated at 84 in FIG. 7 may be applied, for example, to the striations 20 on the male portion 18 before insertion.

It will be appreciated, of course, that the thickness of the adhesive bonding layers illustrated in FIGS. 2, 4, 5, 6, and 7 has been exaggerated for clarity. Further, in those embodiments wherein a permanent installation between the first member 28 and second member 64 is desired, an adhesive bonding layer 86, as shown in FIG. 6, may be applied between the outer portion 48 of the female joining means 40 and the base portion 12 of the male joining means 10 at the intersection thereof.

FIGS. 8A and 8B illustrate another embodiment 90 useful in the practice of the present invention. As shown in FIGS. 8A and 8B a male joining means 92 is adapted for installation in a female joining means 94. However, in the embodiment 90, the male portion 94 of the male joining means 92 is provided with an enlarged headed portion 96 at the outer end thereof having a width $w_3$ that is greater than the width $w_4$ of the stem section 98 of the male portion 92. The corresponding female joining means 94 has an enlarged section 100 of the cavity 102 for accepting the enlarged headed portion 96 of the male portion 92. The preselected resiliency of the female joining means 94 allows the resilient deflection of the outer portion 104 of the female joining means 94 during installation of the male portion 92 therein until the headed portion 96 is seated in the enlarged section 100 of the cavity 102. Adhesive bonding may, if desired, be utilized between the male portion 92 and the female joining means 94 for a permanent installation.

FIGS. 9 and 10 illustrate other embodiments of the attachment means that may be utilized for attaching the female joining means and the male joining means to the respective members to be coupled together. As shown in FIG. 9, the extending mounting section 106 is in the form of a triangular prism for insertion in a groove in the member and in FIG. 10 the mounting section 108 is in the form of a cylindrical section. These may be utilized in place of the mounting sections 66 and 32 shown for the female joining means 40 and male joining means 10 respectively, as described above.

FIGS. 11 and 12 illustrate another embodiment generally designated 110 of the present invention for joining two members, 112 and 114 together in a predetermined angular relationship other than a right angle relationship. The male joining means 114 is generally similar to the male joining means 10 described above except the male portion 116 extends from the base 118 thereof at a predetermined angle a which is other than a right angle.

The female joining means 120 shown on FIG. 12 is substantially identical to the female joining means 40 described above and the surface section 122 of the second member 124 to which the female joining means 120 is coupled abuts against the surface section 126 of the first member 128 to which the male joining means 112 is coupled to provide an installation of the second member 124 at the angle a with respect to the first member 126.

This concludes the description of the preferred embodiments of the present invention. Those skilled in the art may find many variations and adaptations thereof and the appended claims are intended to cover all such variations and adaptations falling within the true scope and spirit of the invention.

I claim:

1. An interlocking furniture arrangement for coupling together a plurality of intersecting members in an article of furniture in preselected angular relationships and comprising in combination:

at least one first member having an inside surface and an outside surface;

at least one second member coupled in an intersecting relationship to said at least one first member, and having an inside surface and an outside surface, and said inside surface of said at least one first member abutting said inside surface of said at least one second member at a first predetermined angular relationship;

a male joining means coupled to said inside surface of said at least one first member at a preselected location thereon in regions adjacent said abutment to said inside surface of said at least one second member, and comprising:

a base portion having a first surface and a second surface;

first attachment means for attaching said first surface of said base portion to said inside surface of said at least one first member; and a male portion outwardly upstanding a first preselected height from said second surface of said base portion at said preselected angular relationship, and having a first preselected length along said base portion, and a first preselected thickness;

a female joining means coupled to said inside surface of said at least one second member at a preselected location thereon in regions adjacent said abutment to said inside surface of said at least one first member, and in coupling relationship to said male joining means and comprising:

a base portion having a first surface and a second surface;

second attachment means for attaching said first surface of said base portion of said female joining means to said inside surface of second member;

an outer portion spaced from said base portion and having walls defining an interior surface oppositely disposed to said second surface of said base portion, and said interior surface of said outer portion and said second surface of said base portion defining a male portion receiving cavity having an open end and a closed end and extending substantially parallel to said first surface of said at least one second member, and said male portion of said male joining member inserted in said cavity from said open end thereof, to provide said coupling relationship therebetween, and said cavity having a second preselected length along said base portion, a first preselected depth and a first preselected width; and retention means cooperatively interacting between said male joining means and said female joining means for retaining said male portion of said male joining means in said cavity of said female joining means in said coupling relationship.

2. The arrangement defined in claim 1 wherein: said first attachment means and said second attachment means for attaching said male joining means to said inside surface of said at least one first member and said female joining means to said inside surface of said at least one second member, respectively, comprise a layer of adhesive bonding material intermediate said first surface of said base portions and said inside surfaces of said at least one first and second members, respectively.

3. The arrangement defined in claim 2 wherein:

said first and second attachment means further comprises:

said inside surfaces of said at least one first and said second members have walls defining grooves therein at said preselected locations thereon;

said base portions of said male joining means and said female joining means have extending mounting sections protruding from said first surfaces thereof for positioning in said grooves.

4. The arrangement defined in claim 1 wherein:

said male joining means and said female joining means are semi-rigid having a predetermined resiliency;

said retention means further comprises:

striations on said male portion of said male joining means extending along the length thereof;

striations on said second surface of said base portion and said interior of said outer portion of said female joining member extending along the length thereof for frictional interengagement with said striations on said male portion of said male joining member for the retention of said male portion inserted into said cavity.

5. The arrangement defined in claim 4 wherein:

said retention means further comprises:

a strip of adhesive bonding material between said outer portion of said female joining means and said outer surface of said base portion of said male joining means.

6. The arrangement defined in claim 4 wherein:

said retention means further comprises adhesive bonding material intermediate said striations on said male portion of said male joining means and said striations on said walls defining said cavity of said female joining means.

7. The arrangement defined in claim 4 wherein:

said striations on said male portion of said male joining means define right triangular prisms having an inner surface substantially perpendicular to the median plane of said male portions; and said striations on said walls defining said cavity of said female joining means are right triangular prisms having an outer surface substantially perpendicular to the median plane of said cavity, whereby said male portion is inserted into said cavity from said open end thereof and said cavity resiliently deforms to accept said male portion during insertion, and said inner surfaces of said striations on said male portion engage outer surfaces of said striations on said walls defining said cavity of said female joining means to resiliently resist removal of said male portion.

8. The arrangement defined in claim 1 wherein:

said male joining means and said female joining means are semi-rigid having a predetermined resiliency;

said retention means further comprises:

a headed section on said male portion of said male joining means at said first preselected height, and said headed section having a second preselected width greater than said first preselected width; and said cavity in said female joining means having a head receiving section spaced said first preselected height from said open end thereof for receiving said headed section of said male joining means, whereby said outer portion of said female joining means resiliently deflects during insertion of said male portion in said cavity to allow insertion of said headed section on said male portion in said head receiving section of said cavity.

9. The arrangement defined in claim 1 wherein:
said female joining means is semi-rigid having a predetermined resiliency;
said open end of said cavity in said female joining means has a width less than the width of said cavity in regions adjacent the closed end thereof,
whereby said female joining means is resiliently deformable to allow insertion of said male portion of said male joining means in said cavity and said surfaces defining said cavity frictionally engage said male portion after insertion.

10. The arrangement defined in claim 9 wherein said retention means further comprises:
an adhesive bonding layer intermediate said male portion and said surfaces defining said cavity for bonding said female joining means to said male joining means.

11. The arrangement defined in claim 1 wherein said first preselected length of said male portion of said male joining means is different from said second preselected length of said cavity of said female joining means.

12. The arrangement defined in claim 1 wherein first preselected length of said male portion of said male joining means is substantially the same as said second preselected length of said cavity of said female joining means.

13. The arrangement defined in claim 3 wherein:
said male joining means and said female joining means are semi-rigid having a predetermined resiliency;
said retention means further comprises:

striations on said male portion of said male joining means comprising a plurality of substantially parallel type triangular prisms extending substantially along the length thereof, and each of said right triangular prisms having an inner surface substantially perpendicular to the median plane of said male portion;

striations on said oppositely disposed surfaces defining said cavity of said female joining member for frictional engagement with said striations on said male portion of said male joining member, and said striations on said oppositely disposed surfaces defining said cavity comprising a plurality of right triangular prisms extending substantially said second preselected length, and each of said right triangular prisms having an outer surface substantially perpendicular to the median plane of said cavity, whereby said inner surfaces of said striations of said male portion frictionally engage said outer surfaces of said striations on said surfaces defining said cavity and said female joining means.

14. The arrangement defined in claim 13 wherein:
said striations on said male portion of said male joining means are in a substantially parallel array and extending on said male portion substantially throughout said first preselected height; and
said striations on said oppositely disposed surfaces defining said cavity of said female joining means are in a substantially parallel array and extending throughout said first preselected depth of said cavity from said open end to said closed end thereof;
said first preselected height of said male portion is substantially equal to said first preselected depth of said cavity.

15. The arrangement defined in claim 14 wherein:
said retention means further comprises:
an adhesive bonding layer intermediate said striations on said male portion of said male joining means and said striations on said oppositely disposed surfaces defining said cavity of said female joining means.

16. The arrangement defined in claim 15 wherein:
said predetermined angular relationship comprises substantially a right angle.

* * * * *